US012505559B2

(12) United States Patent
Gharbi et al.

(10) Patent No.: US 12,505,559 B2
(45) Date of Patent: Dec. 23, 2025

(54) CRAWL APPROACH FOR CREATION AND AUTOMATIC ANNOTATION OF CUSTOM DATASETS

(71) Applicant: The Boeing Company, Arlington, VA (US)

(72) Inventors: Aroua Gharbi, Huntsville, AL (US); Anthony Wayne Baker, Gilbertsville, PA (US)

(73) Assignee: The Boeing Company, Arlington, VA (US)

( * ) Notice: Subject to any disclaimer, the term of this patent is extended or adjusted under 35 U.S.C. 154(b) by 346 days.

(21) Appl. No.: 18/465,828

(22) Filed: Sep. 12, 2023

(65) Prior Publication Data

US 2025/0086808 A1    Mar. 13, 2025

(51) Int. Cl.
*G06K 9/00*      (2022.01)
*G06T 7/207*     (2017.01)

(52) U.S. Cl.
CPC .......... *G06T 7/207* (2017.01); *G06T 2210/12* (2013.01)

(58) Field of Classification Search
CPC ....... G06T 7/207; G06T 2210/12; G06T 3/14; G06T 7/0004; G06T 2207/10016; G06T 2207/30204; G06T 2207/30244; G06T 2219/004; G06T 7/246
See application file for complete search history.

(56) References Cited

U.S. PATENT DOCUMENTS

| 10,643,329 | B2 * | 5/2020 | Afrasiabi | G06T 7/97 |
| 10,997,712 | B2 * | 5/2021 | Cao | G06T 7/33 |
| 11,992,950 | B2 * | 5/2024 | Jo | B25J 9/162 |
| 2013/0162803 | A1 | 6/2013 | Steckhan et al. | |
| 2024/0355007 | A1 * | 10/2024 | Sasaki | G06T 7/70 |

FOREIGN PATENT DOCUMENTS

| CN | 104568983 A | * | 4/2015 | ........... G01N 21/954 |
| CN | 113135191 A | * | 7/2021 | ............ B60W 50/00 |
| CN | 115619870 A | * | 1/2022 | ............... G06T 7/80 |
| CN | 114026581 A | * | 2/2022 | ....... G06Q 10/06313 |
| CN | 116664984 A | * | 8/2023 | ........... G01N 21/954 |
| CN | 219576710 U | * | 8/2023 | ............. Y02T 10/70 |
| EP | 3553741 A1 | | 10/2019 | |

OTHER PUBLICATIONS

European Patent Office Extended Search Report, dated Feb. 17, 2025, regarding Application No. EP24196422.0, 9 pages.
Richard Szeliski: "Image Alignment and Stitching: A Tutorial", Foundations and Trends in Computer Graphics and Vision, vol. 2, No. 1, Jan. 1, 2006 (Jan. 1, 2006), pp. 1-104, XP055227909, US, ISSN: 1572-2740, DOI: 10.1561/0600000009.

* cited by examiner

*Primary Examiner* — Shervin K Nakhjavan
(74) *Attorney, Agent, or Firm* — Yee & Associates, P.C.

(57) ABSTRACT

A method of creating custom datasets is provided. The method comprises capturing, with a camera, a sequence of images of a surface in a specified crawl direction over a number of sequential crawl steps that represent changes of camera position. For each crawl step, the method matches a first image and a second image captured at sequential camera positions. The method models each crawl step as a pairwise quadratic transformation between the first image and second image according to a number of respective anchor points in each image selected as best candidates to fit a regression model.

20 Claims, 11 Drawing Sheets

FIG. 12

CRAWL APPROACH FOR CREATION AND AUTOMATIC ANNOTATION OF CUSTOM DATASETS

BACKGROUND INFORMATION

Technical Field

The present disclosure relates generally to visual inspection, and more specifically to create custom datasets for computer-vision based structural health monitoring.

Background

Building a computer-vision-based model for structural health monitoring requires a large dataset that encompasses various conditions in which a surface can be captured. Existing datasets are usually generated in controlled laboratory setups with almost ideal environmental conditions. Therefore, they are not suitable for real life industrial applications. Creating custom datasets traditionally requires manual annotation.

SUMMARY

An illustrative embodiment provides a computer-implemented method of creating custom datasets. The method comprises capturing, with a camera, a sequence of images of a surface in a specified crawl direction over a number of sequential crawl steps that represent changes of camera position. For each crawl step, the method matches a first image and a second image captured at sequential camera positions. The method models each crawl step as a pairwise quadratic transformation between the first image and second image according to a number of respective anchor points in each image selected as best candidates to fit a regression model.

Another illustrative embodiment provides a system for creating custom datasets. The system comprising a storage device that stores program instructions and one or more processors operably connected to the storage device and configured to execute the program instructions to cause the system to: capture, with a camera, a sequence of images of a surface in a specified crawl direction over a number of sequential crawl steps that represent changes of camera position; for each crawl step, match a first image and a second image captured at sequential camera positions; and model each crawl step as a pairwise quadratic transformation between the first image and second image according to a number of respective anchor points in each image selected as best candidates to fit a regression model.

Another illustrative embodiment provides a computer program product for creating custom datasets. The computer program product comprises a non-volatile computer readable storage medium having program instructions stored thereon to perform the operations of: capturing, with a camera, a sequence of images of a surface in a specified crawl direction over a number of sequential crawl steps that represent changes of camera position; for each crawl step, matching a first image and a second image captured at sequential camera positions; and modeling each crawl step as a pairwise quadratic transformation between the first image and second image according to a number of respective anchor points in each image selected as best candidates to fit a regression model.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that existing datasets for computer-vision-based modeling are usually generated in controlled laboratory setups with almost ideal environmental conditions that are not suitable for real life industrial applications.

The illustrative embodiments recognize and take into account that creating custom datasets is time consuming because the annotation is usually performed manually, relying on human annotators to mark objects in an image. If an object is captured under various light conditions all of the corresponding images need to be manually annotated as well. In addition to the time and cost associated with these manual methods, proprietary data may need to be shared with third party vendors.

The illustrative embodiments provide a method for collecting computer-vision data in a stepwise crawl manner. This crawl approach bypasses the human labeling step by estimating the transformations between images to propagate the bounding boxes of labeled objects. By using the crawl approach, one need only focus on replicating the variable conditions in which the images are taken. Truth data of one image can be automatically tracked in all other images.

Figure 1:
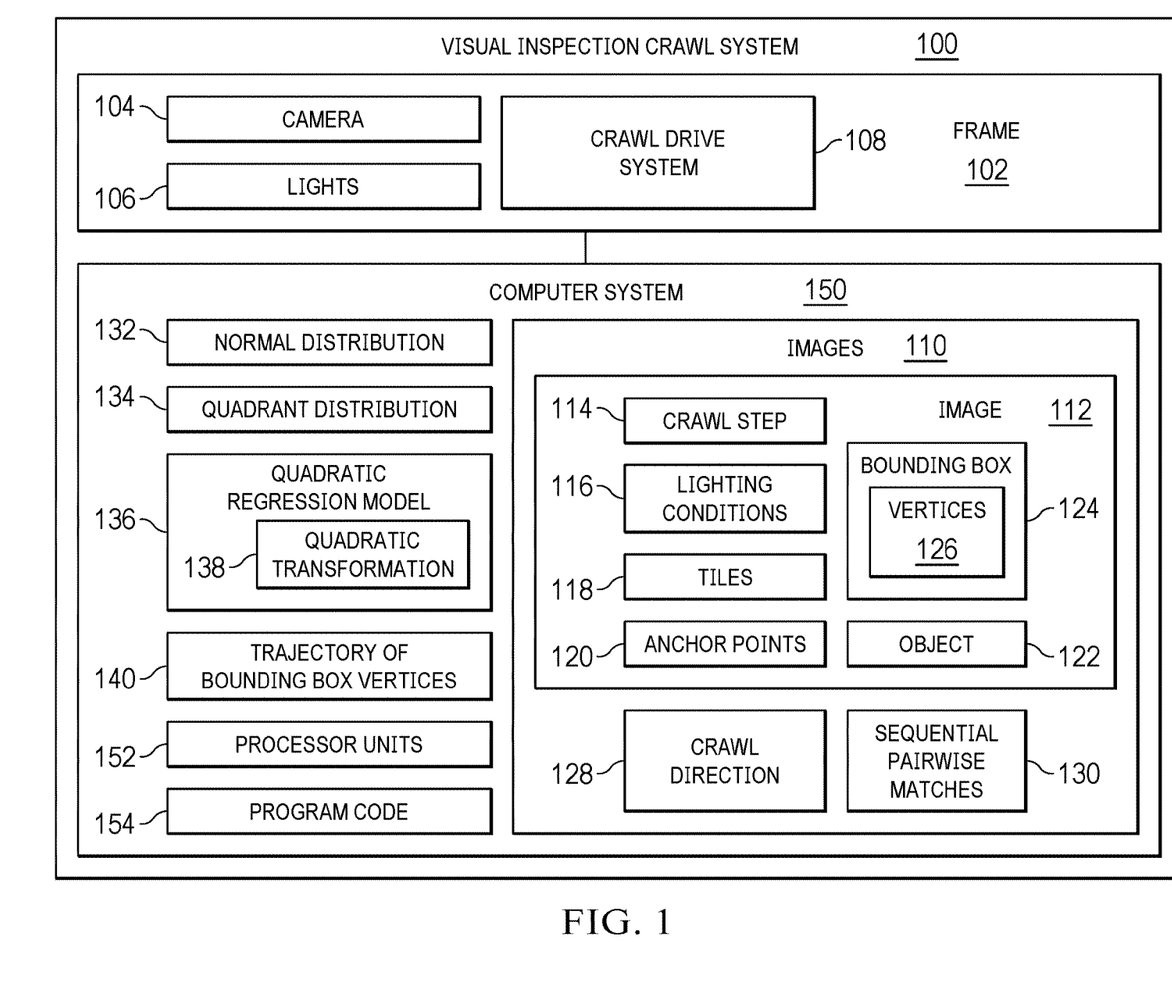
FIG. 1 is an illustration of a block diagram of a visual inspection crawl system in accordance with an illustrative embodiment.

With reference now to FIG. 1, an illustration a block diagram of a visual inspection crawl system is depicted in accordance with an illustrative embodiment.

Visual inspection crawl system 100 comprises a frame 102 which holds a camera 104 and a number of lights 106 that illuminate a surface to be inspected. Crawl drive system 108 moves the frame 102 in a stepwise manner in a crawl direction 128 (see FIG. 2).

Camera 104 captures images 110 sequentially in the crawl direction 128. Each image 112 in the sequence of images 110 is taken at a specific crawl step 114 which represents the camera position along crawl direction 128. Lights 106 can be used to create a number of different lighting conditions 116 for each image 112. For example, at each craw step 114, camera 104 might take a picture with the light 106 illuminating the surface from the right only, from the left side only, and with the lights off (see FIG. 3). In this manner an object 122 of interest can be captured in various light settings. At every crawl step 114, the object 122 is captured for each of the lighting conditions 116. Images 110 taken under one lighting condition constitute a crawl sequence.

The images 110 are organized into sequential pairwise matches 130. The change in camara position represented by each crawl step 114 is modeled as a pairwise quadratic transformation 138, i.e., the change between two consecutive images 110 in a sequence can be fit as a quadratic regression model 136 (see FIG. 4). Fitting a regression model 136 requires a set of dependent and independent anchor points 120. Since the crawl direction 128 and crawl step 114 are known, these anchor points 120 are generated using tile-based template matching (see FIG. 5).

Each image 112 is divided into a number of tiles 118. The use of tiles 118 reduces the search space, thereby speeding up the process. The matching results of two images are combined from all the different lighting conditions 116. These results undergo statistical and quadrant-based filtering according to a normal distribution 132 and quadrant distribution 134 to generate the best anchor points 120 for the quadratic regression model 136 (see FIG. 6).

This matching process is repeated for every sequential pair of images in a sequence.

Figure 7:
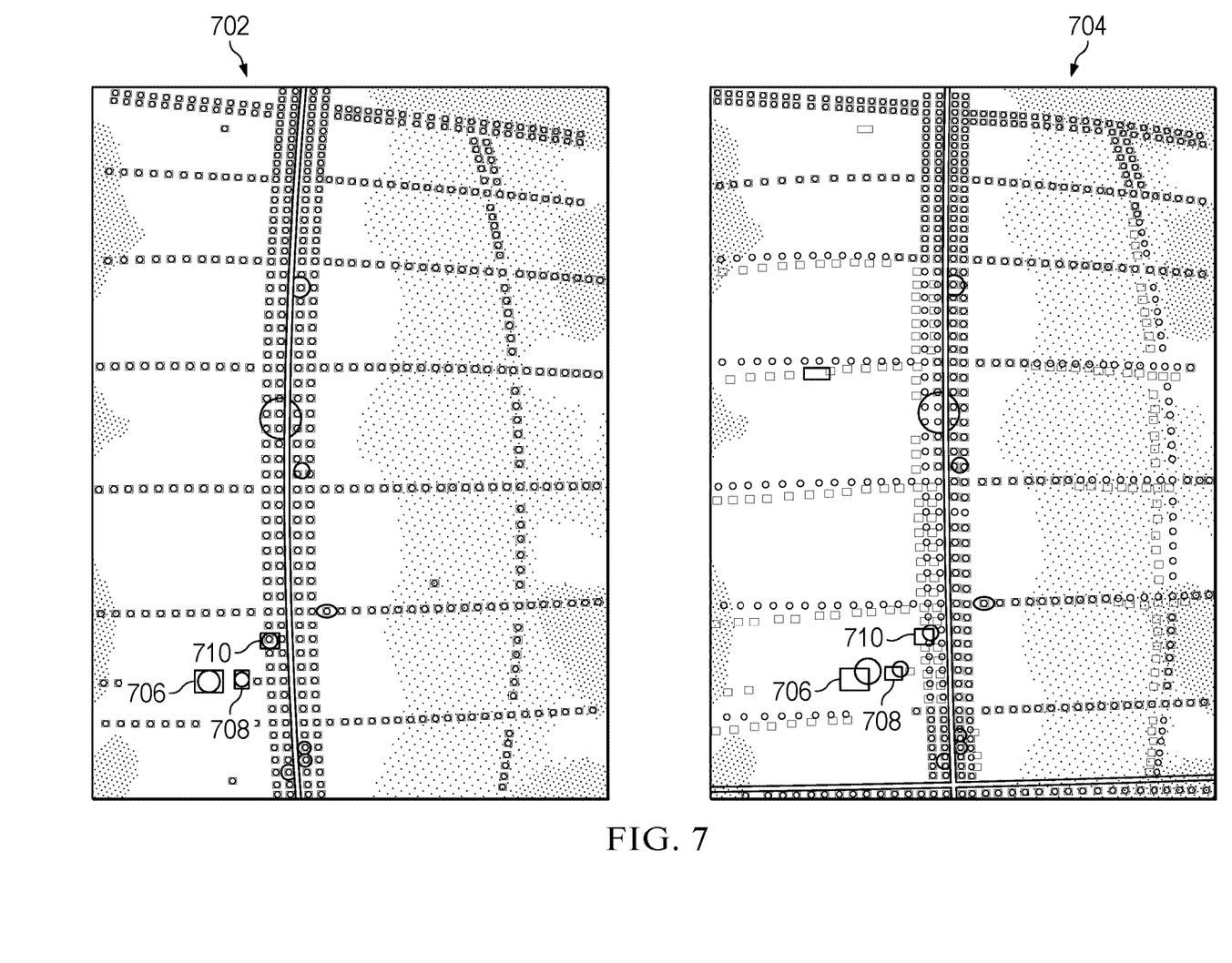
FIG. 7 illustrates bounding boxes for objects in an image in accordance with an illustrative embodiment.

The models estimated through quadratic transformation 138 are used to predict the vertices 126 of a bounding box 124 around the object 122 of interest (see FIG. 7). The truth data only needs to be provided for one image, in one sequence. The quadratic regression model 138 predicts the trajectory 140 of the bounding box vertices across the crawl direction 128, thereby automatically annotating all the sequences in all lighting conditions 116 (see FIG. 8). Each trajectory 140 is characterized by a score that reflects the correctness of data propagation, further ensuring the robustness of the dataset.

Visual inspection crawl system 100 can be implemented in software, hardware, firmware, or a combination thereof. When software is used, the operations performed by visual inspection crawl system 100 can be implemented in program code configured to run on hardware, such as a processor unit. When firmware is used, the operations performed by visual inspection crawl system 100 can be implemented in program code and data and stored in persistent memory to run on a processor unit. When hardware is employed, the hardware can include circuits that operate to perform the operations in visual inspection crawl system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
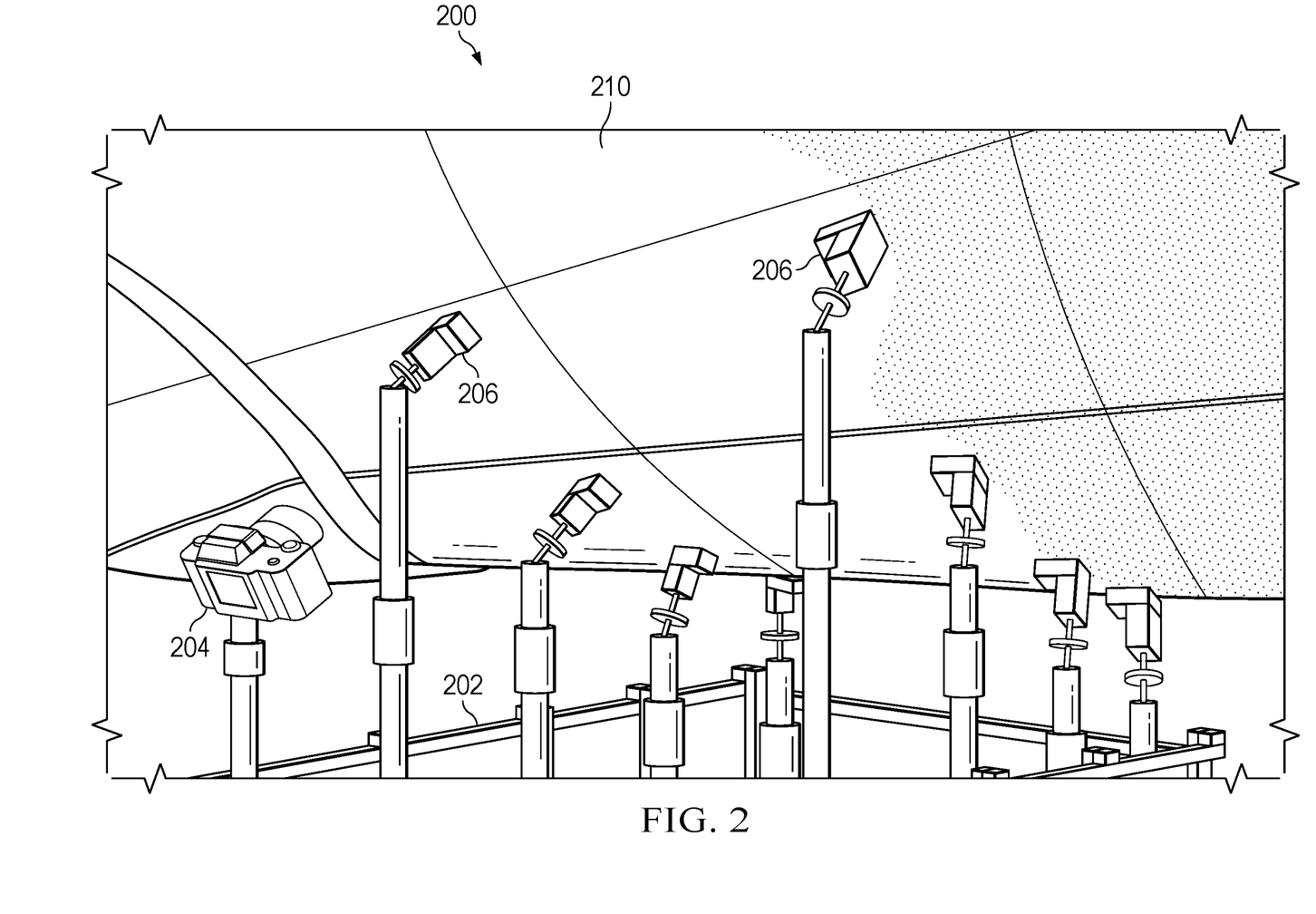
FIG. 2 depicts a computer-vision imaging setup in accordance with an illustrative embodiment.

FIG. 2 depicts a computer-vision imaging setup in accordance with an illustrative embodiment. Setup 200 comprises a frame 202 on which is mounted a camera 204 for imaging surface 210. In the present example surface 210 is the exterior surface of an airplane fuselage, but the principles of the illustrative embodiments can be applied to other types of surfaces.

Also mounted on either side of frame 202 are a number of lights 206. As the frame crawls along surface 210, the lights 206 can be turned on and off to illuminate surface 210 from different directions (see FIG. 3), thereby allowing the camera 204 to capture images under different lighting conditions at each crawl step (camera position) along the surface 210.

Figure 3:
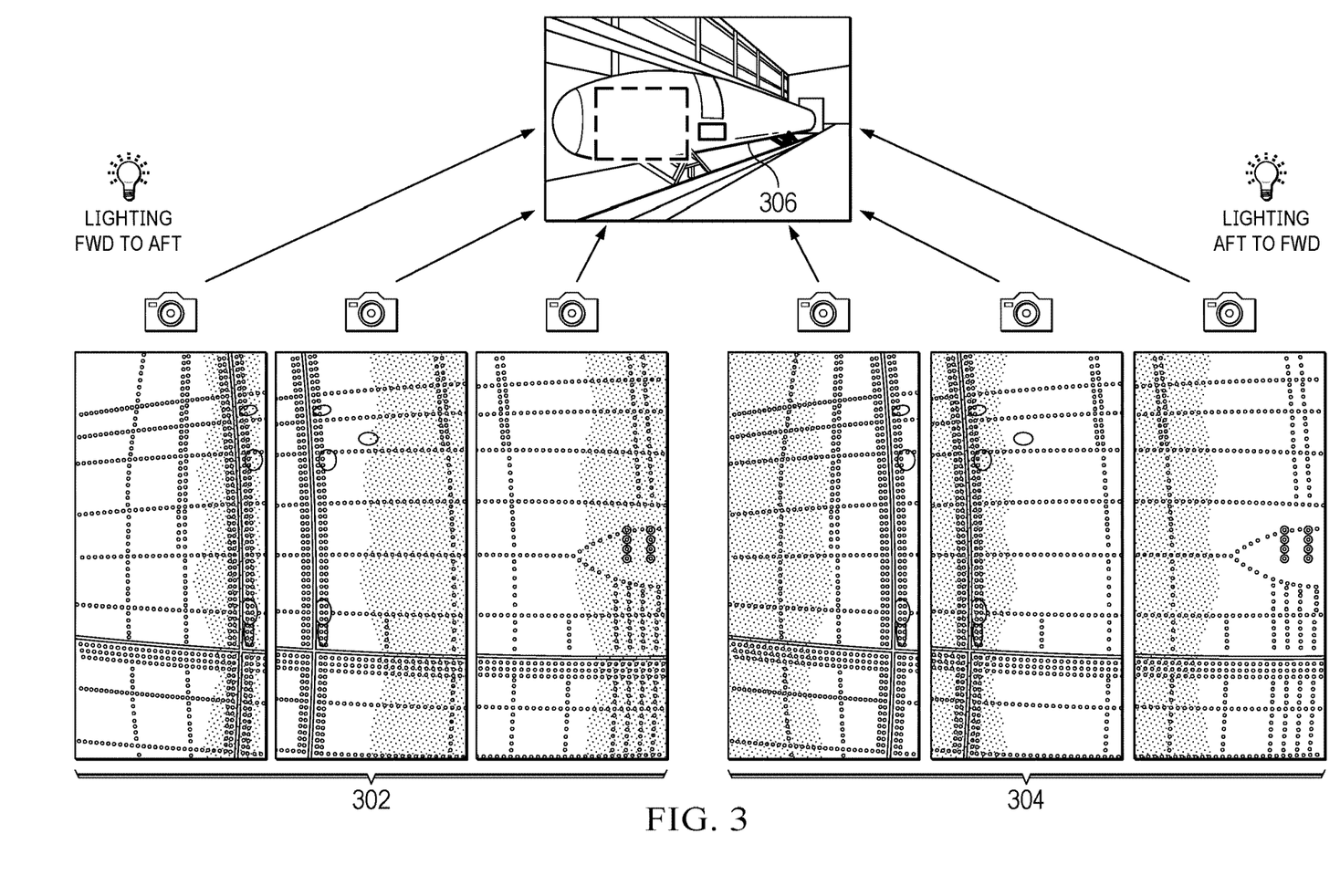
FIG. 3 depicts computer-vision imaging under different lighting conditions in accordance with an illustrative embodiment.

FIG. 3 depicts computer-vision imaging under different lighting conditions in accordance with an illustrative embodiment. FIG. 3 illustrates two image sequences 302, 304 taken with a computer-vision imaging setup such as computer-vision imaging setup 200 in FIG. 2.

In the present example, the image sequences 302, 304 are of the forward section 306 of an airplane fuselage near the nose. Image sequence 302 comprises images captured under lighting conditions in the direction of forward of the fuselage towards the aft. In the context of the images shown, this lighting condition has the lights on the left side of the images, with the lights on the right turned off. Image sequence 304 is the exact opposite, with the illumination being aft to forward, i.e., lights on the right of the images with the lights on the left off.

Image sequences 302, 304 cover the same sections of the fuselage surface, merely under different lighting conditions which alter how surface features and objects of interest appear in the images.

Figure 4:
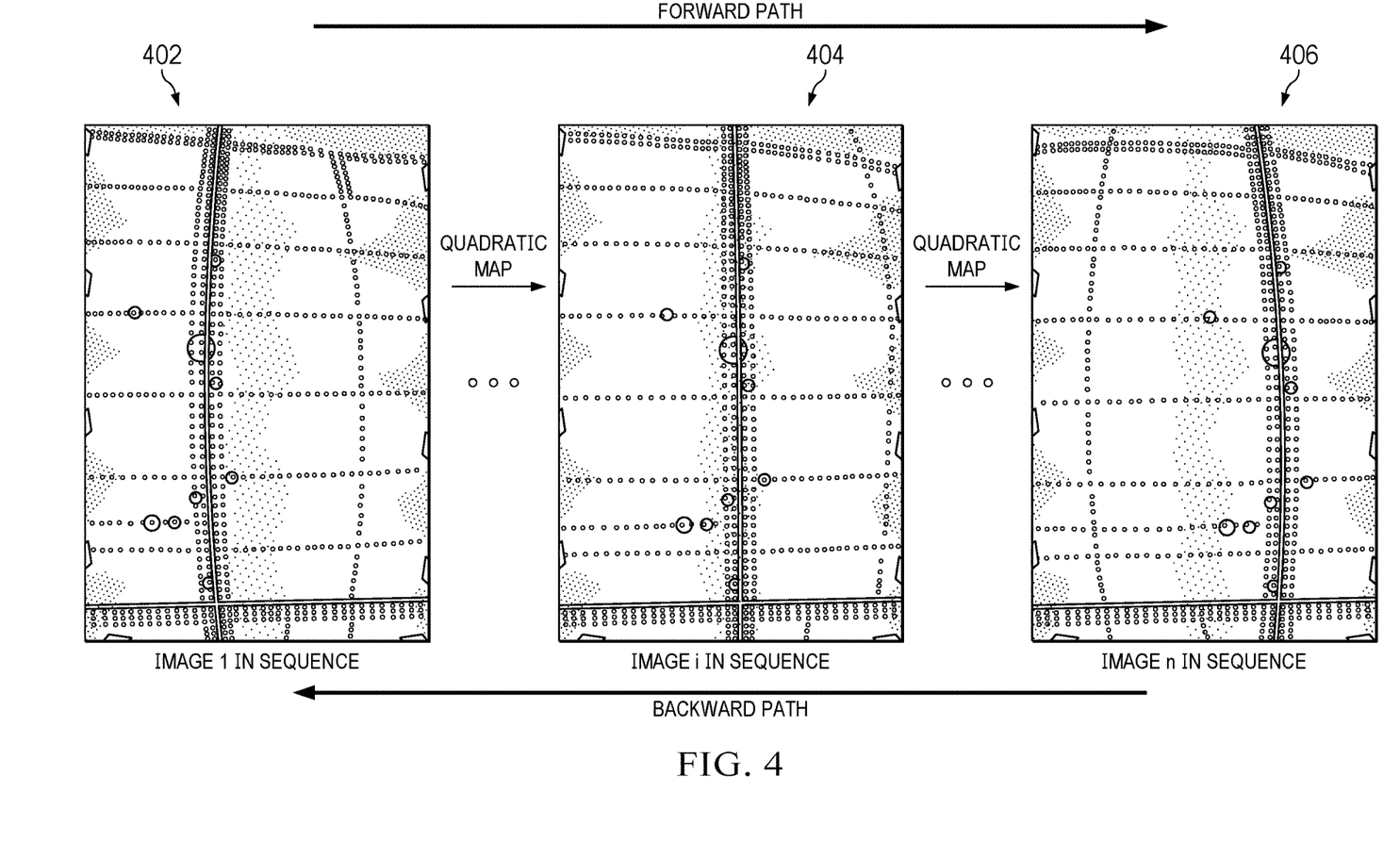
FIG. 4 illustrates pairwise matching of sequential images in accordance with an illustrative embodiment.

FIG. 4 illustrates pairwise matching of sequential images in accordance with an illustrative embodiment. Images 402, 404, 406 represent a crawl set of images taken over a number of crawl steps. These images might be captured in a forward path or backward path as shown.

The methods of the illustrative embodiments are used to quadratically map each image in the sequence to the next sequence in the image in pairwise fashion through the complete sequence. The goal is to utilize the manually labeled bookend images (Image 1 402, Image n 406) to propagate the bounding boxes for objects of interest. The pairwise mapping between images is performed according to a function that maps coordinates between images:

$$(x^*, y^*) = f(x, y)$$

Where x,y are coordinates of the bounding box in the source image, and x*, y* are coordinates of the bounding box in the target image.

Figure 5:
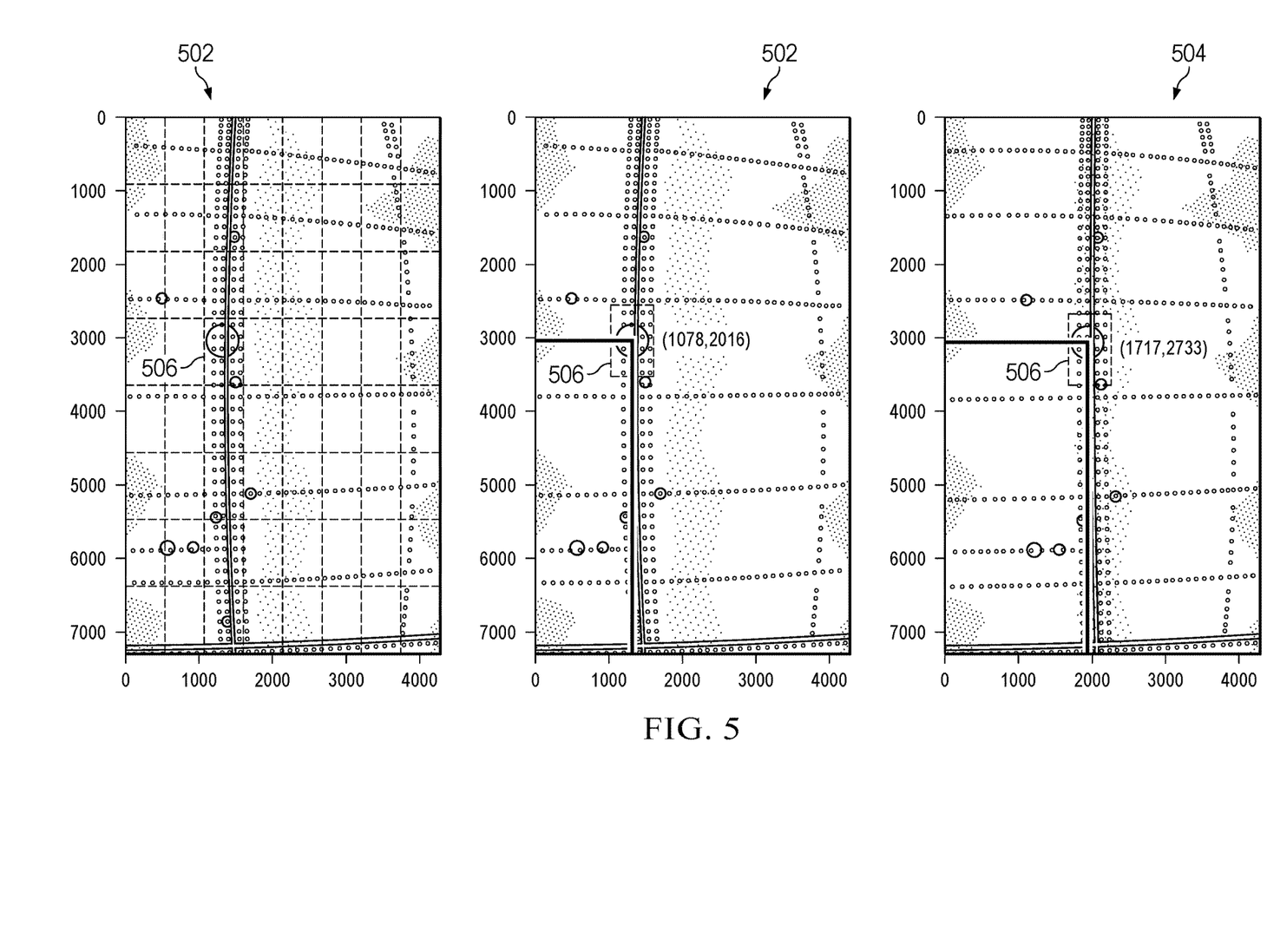
FIG. 5 illustrates the determination of anchor points in images in accordance with an illustrative embodiment.

FIG. 5 illustrates the determination of anchor points in images in accordance with an illustrative embodiment. Image 502 is divided into a number of tiles. Rather than matching whole images to whole images in the sequence, the use of tiles allows for the matching of specific areas between images.

In the present example, tile 506 is being matched between image 502 and image 504. The center of tile 506 defines an anchor point that is present in both images 502, 504. Within pairwise matching, the anchor point in the first image 502 can be referred to as the source anchor point, and the anchor point in the second image can be referred to as the target anchor point. Matching the source and target anchor points between images takes into account that the camera and lights are not necessarily going to move in a perfectly straight line from one crawl step to the next.

Once the source and target anchor points are identified in the matched pair of sequential images the quadratic function that defines the mapping between the images can be estimated.

The above matching process can be applied to other tiles in the images to identify several corresponding source and target anchor points within the sequential images.

Figure 6:
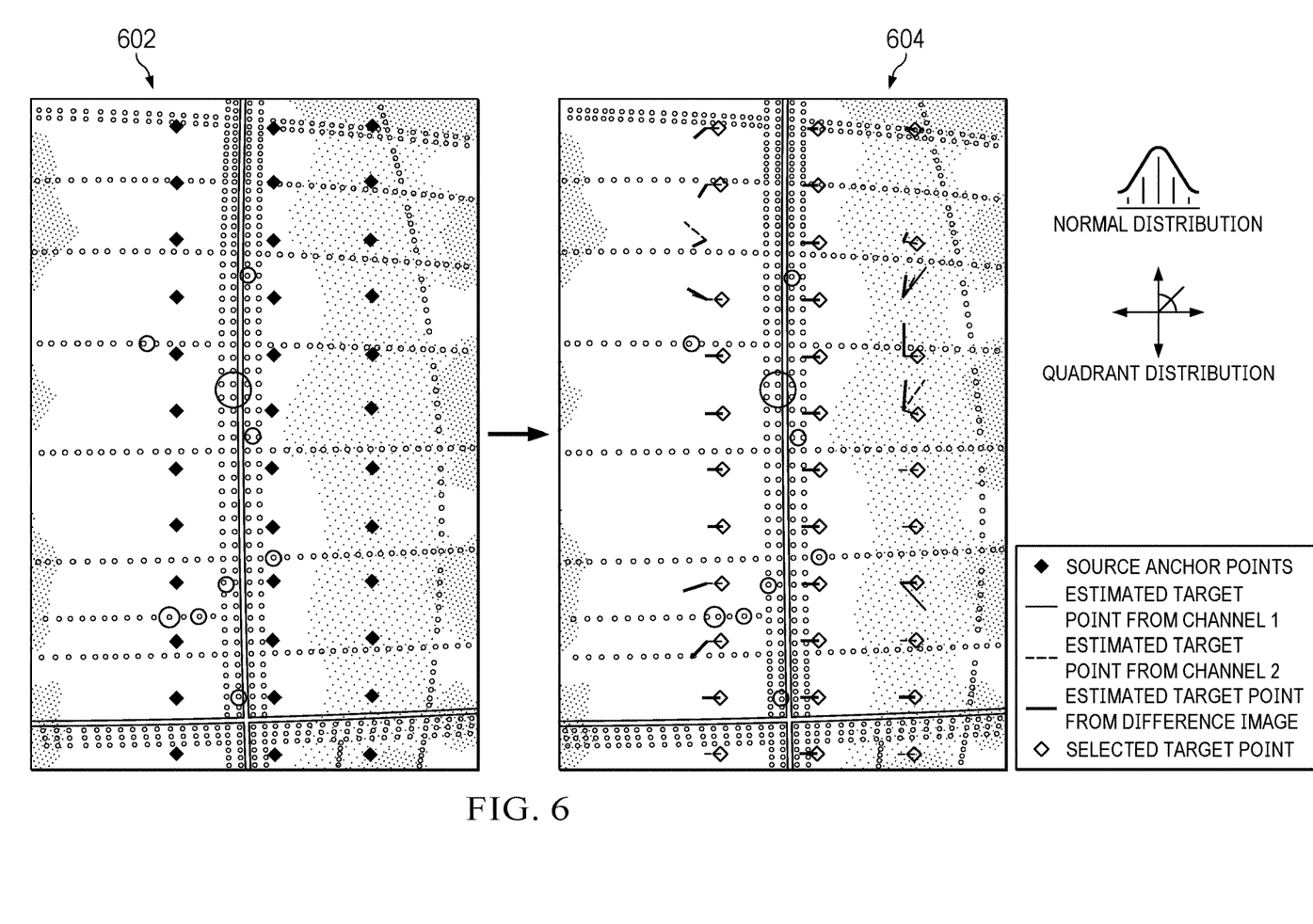
FIG. 6 illustrates the filter of anchor points in accordance with an illustrative embodiment.

FIG. 6 illustrates the filter of anchor points in accordance with an illustrative embodiment. Two steps of filtering are used to identify the most viable source and target anchor points between sequential images. The first filtering steps uses statistical filtering according to a normal distribution, and the second filtering step relies on a quadrant distribution related to the perceived direction of movement of anchor points between the images 602, 604.

The filtering process can rely on several sequences of data. In the present example, the sequences (channels) of data comprise one sequence under a first lighting condition (e.g., illuminated on the left), a second lighting condition (e.g., illuminated on the on right), and a difference image generated from the difference between the other two lighting conditions. The filtering process attempts to determine how and where the respective anchor points moved between images under the different lighting conditions.

Anchor points with associated location data that fall outside a defined range within a normal distribution are eliminated (e.g., more than one or two standard deviations). In such cases the apparent location of these anchor points in the second image has deviated too largely from the area in which they would expect to be found from one image to the next according to the movement of the camera (allowing for some degree of imperfect drift of the camera and lights).

Quadrant distribution filtering relates to the direction of movement of candidate target anchor points relative to the source anchor points, as shown by the arrows in image 604. Since the direction of camera movement (crawl direction) between the images 602, 604 is known, the anchor points should appear to move in the same direction. Furthermore, the anchor points should also be expected to move within a limited range of angles (again accounting for potential drift of the camera between crawl steps). Therefore, anchor points with an apparent direction and angle of movement outside a prescribed quadrant of direction are also eliminated.

FIG. 7 illustrates bounding boxes for objects in an image in accordance with an illustrative embodiment. In this example, image 702 has a number of objects of interest (surface features) which are surrounded by respective bounding boxes 706, 708, 710. If the quadratic mapping between images is not reliable, the bounding boxes 706, 708, 710 in the subsequent image 704 will not properly bound the objects due to the failure to accurately predict the trajectory of the vertices of the bounding boxes across images.

Figure 8:
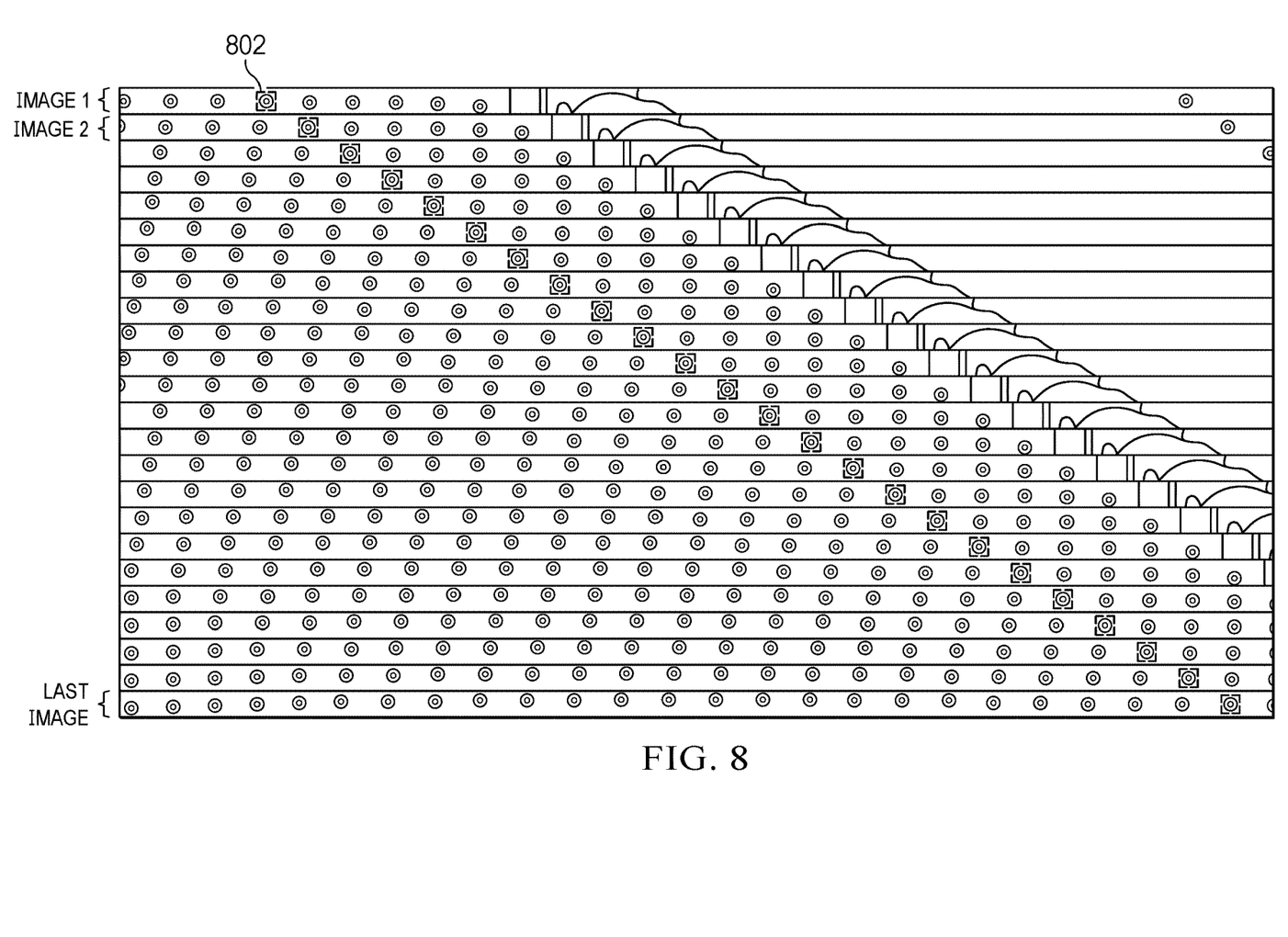
FIG. 8 illustrates an example of accurate bounding box tracking across a sequence of images in accordance with an illustrative embodiment.

FIG. 8 illustrates an example of accurate bounding box tracking across a sequence of images in accordance with an illustrative embodiment. In this particular example, a bounding box 802 is placed around a specific rivet and then tracked across the sequence of images as the camera progressively moved over the surface in the crawl direction. Because the quadratic mapping between the images is accurate in this example, the bounding box 802 is maintained around the rivet in question, allowing accurate tracking across the image sequence.

Figure 9:
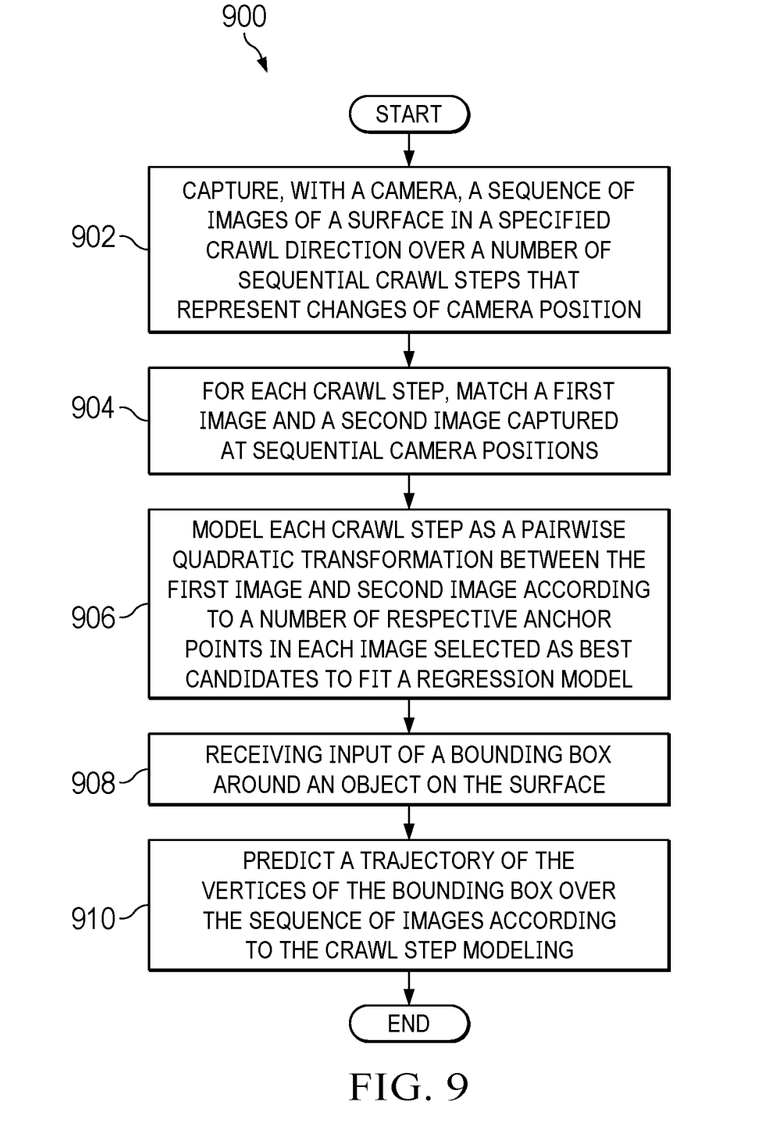
FIG. 9 depicts a flowchart of a process for creating custom datasets in accordance with an illustrative embodiment.

FIG. 9 depicts a flowchart of a process for creating custom datasets in accordance with an illustrative embodiment. Process 900 can be implemented in hardware, software, or both. When implemented in software, the process can take the form of program code that is run by one of more processor units located in one or more hardware devices in one or more computer systems. For example, process 900 can be implemented in visual inspection crawl system 100 in FIG. 2.

Process 900 begins by capturing, with a camera, a sequence of images of a surface in a specified crawl direction over a number of sequential crawl steps that represent changes of camera position (operation 902). The image captured at each crawl step might be captured under a number of different lighting conditions.

For each crawl step, process 900 matches a first image and a second image captured at sequential camera positions (operation 904).

Process 900 models each crawl step as a pairwise quadratic transformation between the first image and second image according to a number of respective anchor points in each image selected as best candidates to fit a regression model (operation 906). The anchor points can be selected according to a statistical filter for a distribution of position of the anchor points across the different lighting conditions. The anchor points can also be selected according to distribution of direction of movement of the anchor points across the different lighting conditions.

Process 900 receives input of a bounding box around an object on the surface (operation 908) and predicts the trajectory of the vertices of the bounding box over the sequence of images according to the crawl step modeling (operation 910). Specifying the trajectory of the vertices of the bounding box can automatically annotate the sequence of images in all lighting conditions, wherein truth data only needs to be provided for one image in the sequence. A unique identifier of the object can be used to filter any duplicate images. Process 900 then ends.

Figure 10:
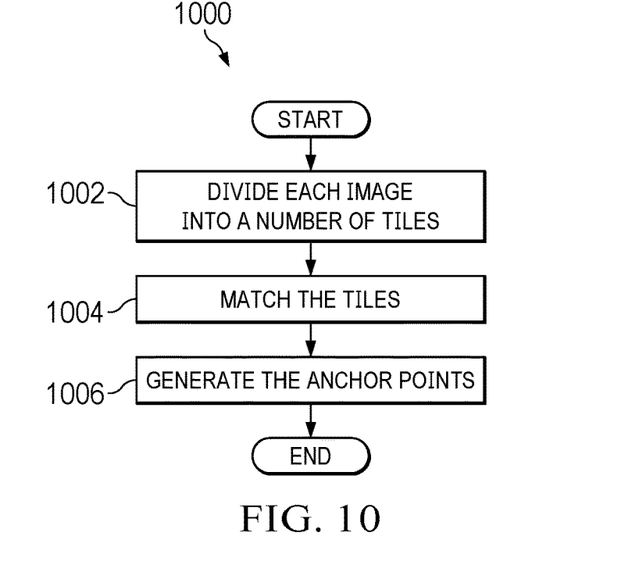
FIG. 10 depicts a flowchart of a process for matching the first image and second image for each crawl step in accordance with an illustrative embodiment.

FIG. 10 depicts a flowchart of a process for matching the first image and second image for each crawl step in accordance with an illustrative embodiment. Process 1000 is a detailed example of operation 904 in FIG. 9.

Process 1000 begins by dividing each image into a number of tiles (operation 1002) and matches the tiles (operation 1004). Process 1000 then generates the anchor points (operation 1006). Process 1000 then ends.

Figure 11:
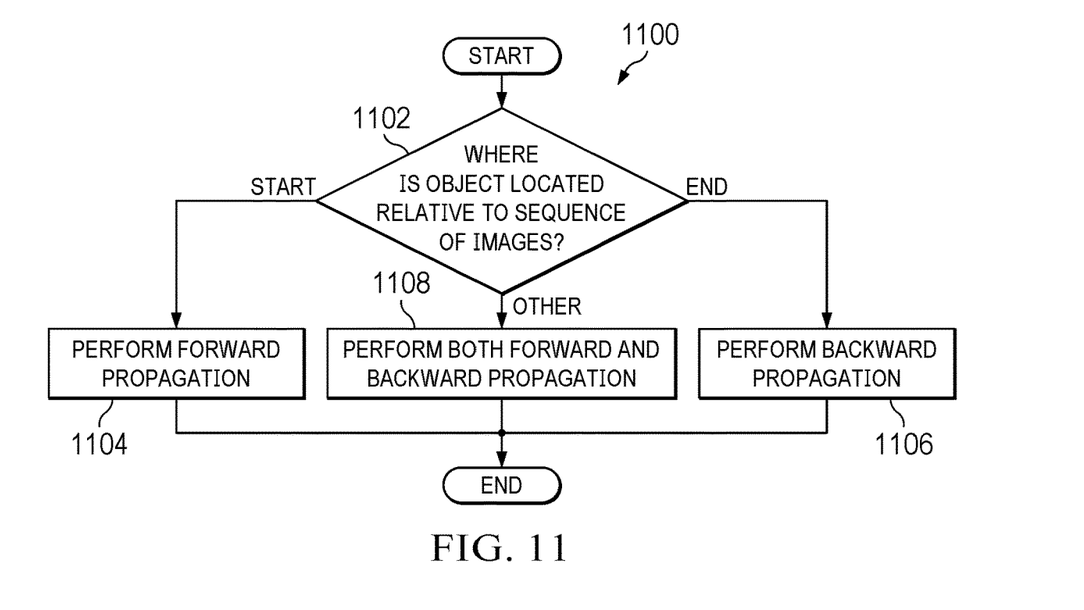
FIG. 11 depicts a flowchart of a process for propagating the bounding box in accordance with an illustrative embodiment.

FIG. 11 depicts a flowchart of a process for propagating the bounding box in accordance with an illustrative embodiment. Process 1100 is a detailed example of operation 910 in FIG. 9.

Process 1100 begins by determining where the object is located relative to the sequence of images (operation 1102).

Responsive to a determination that the object is located at the start of the sequence of images, process 1100 performs forward propagation (operation 1104).

Responsive to a determination that the object is located at the end of the sequence of images, process 1100 performs backward propagation (operation 1104).

Responsive to a determination that the object is located at a position other than the start or end of the sequence of images, process 1100 performs both forward and backward propagation (operation 1106). Process 1100 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
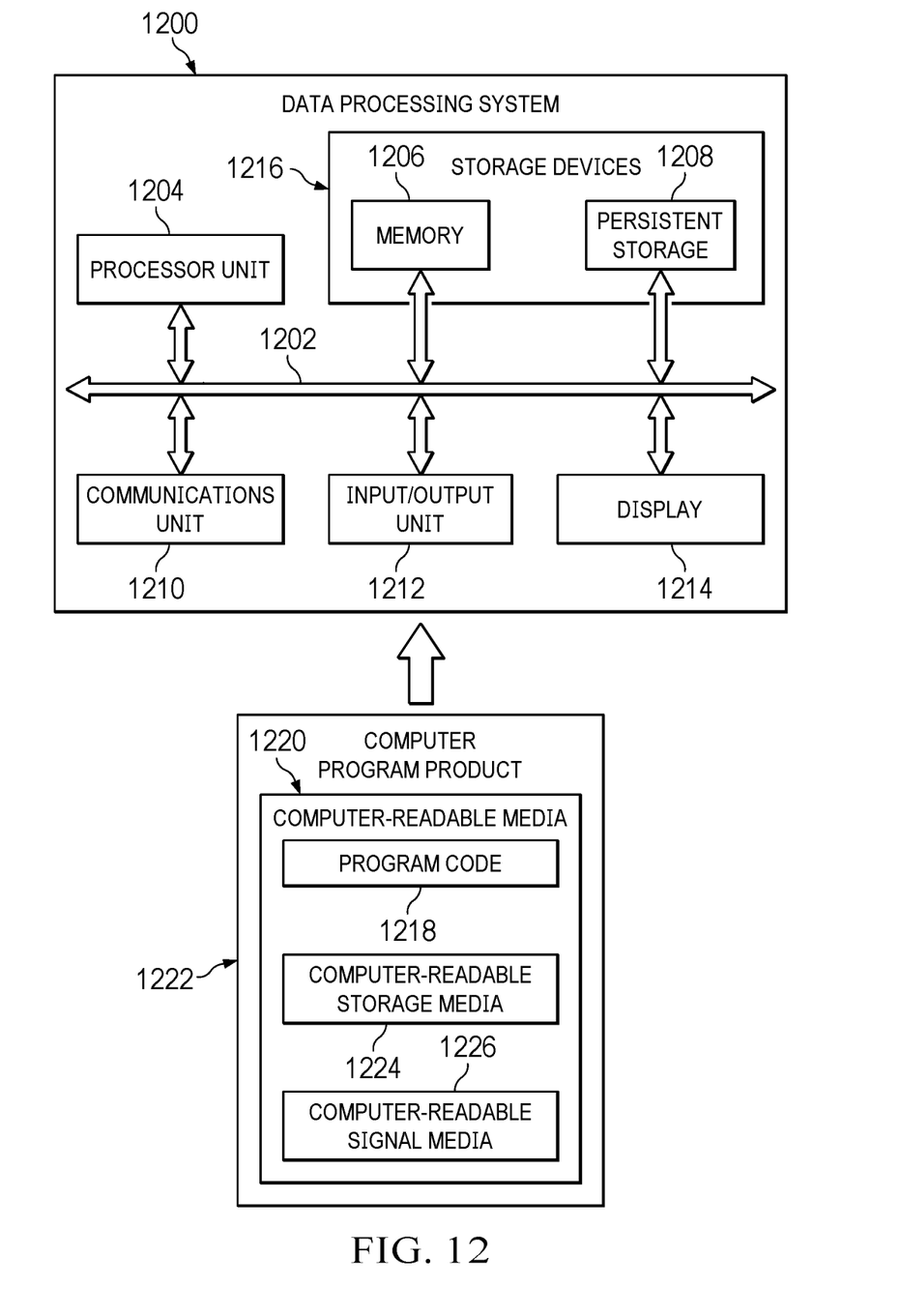
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 150 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that may be loaded into memory 1206. Processor unit 1204 may be a number of processors, a multi-processor core, or some other type of processor, depending on the particular implementation. In an embodiment, processor unit 1204 comprises one or more conventional general-purpose central processing units (CPUs). In an alternate embodiment, processor unit 1204 comprises one or more graphical processing units (GPUS).

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208. Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method in the form of a block diagram is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft in the form of a block diagram is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative embodiments may be used during component and subassembly manufacturing 1306, system integration 1308, in service 1312, or maintenance and service 1314 of FIG. 13. For example, visual inspection crawl system 100 can be used to perform operations on a workpiece to form a component of one of airframe 1402. As another example, visual inspection crawl system 100 can be used to perform operations on a workpiece during component and subassembly manufacturing 1306. As yet another example, visual inspection crawl system 100 can be used to perform rework or maintenance operations on a workpiece during maintenance and service 1314.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of creating custom datasets, the method comprising:
   using a number of processors to perform the operations of:
   capturing, with a camera, a sequence of images of a surface in a specified crawl direction over a number of sequential crawl steps that represent changes of camera position;
   for each crawl step, matching a first image and a second image captured at sequential camera positions; and
   modeling each crawl step as a pairwise quadratic transformation between the first image and second image according to a number of respective anchor points in each image selected as best candidates to fit a regression model.

2. The method of claim 1, wherein matching the first image and second image further comprises:
   dividing each image into a number of tiles;
   matching the tiles; and
   generating the anchor points.

3. The method of claim 1, wherein the image captured at each crawl step is captured under a number of different lighting conditions.

4. The method of claim 3, wherein the anchor points are selected according to a statistical filter for a distribution of position of the anchor points across the different lighting conditions.

5. The method of claim 3, wherein the anchor points are selected according to distribution of direction of movement of the anchor points across the different lighting conditions.

6. The method of claim 1, further comprising:
   receiving input of a bounding box around an object on the surface; and
   predicting a trajectory of the vertices of the bounding box over the sequence of images according to the crawl step modeling.

7. The method of claim 6, further comprising using a unique identifier of the object to filter any duplicate images.

8. The method of claim 6, wherein specifying the trajectory of the vertices of the bounding box automatically annotates the sequence of images in all lighting conditions, and wherein truth data only needs to be provided for one image in the sequence.

9. The method of claim 6, further comprising:
   responsive to a determination that the object is located at the start of the sequence of images, performing forward propagation;
   responsive to a determination that the object is located at the end of the sequence of images, performing backward propagation; and
   responsive to a determination that the object is located at a position other than the start or end of the sequence of images, performing both forward and backward propagation.

10. A system for creating custom datasets, the system comprising:
    a storage device that stores program instructions;
    one or more processors operably connected to the storage device and configured to execute the program instructions to cause the system to:
    capture, with a camera, a sequence of images of a surface in a specified crawl direction over a number of sequential crawl steps that represent changes of camera position;
    for each crawl step, match a first image and a second image captured at sequential camera positions; and
    model each crawl step as a pairwise quadratic transformation between the first image and second image according to a number of respective anchor points in each image selected as best candidates to fit a regression model.

11. The system of claim 10, wherein matching the first image and second image further comprises:
    dividing each image into a number of tiles;
    matching the tiles; and
    generating the anchor points.

12. The system of claim 10, wherein the image captured at each crawl step is captured under a number of different lighting conditions.

13. The system of claim 12, wherein the anchor points are selected according to a statistical filter for a distribution of position of the anchor points across the different lighting conditions.

14. The system of claim 12, wherein the anchor points are selected according to distribution of direction of movement of the anchor points across the different lighting conditions.

15. The system of claim 10, wherein the processors further execute program instructions to cause the system to:
    receive input of a bounding box around an object on the surface; and
    predict a trajectory of the vertices of the bounding box over the sequence of images according to the crawl step modeling.

16. The system of claim 15, wherein the processors further execute program instructions to cause the system to use a unique identifier of the object to filter any duplicate images.

17. The system of claim 15, wherein specifying the trajectory of the vertices of the bounding box automatically annotates the sequence of images in all lighting conditions, and wherein truth data only needs to be provided for one image in the sequence.

18. The system of claim 15, wherein the processors further execute program instructions to cause the system to:
    responsive to a determination that the object is located at the start of the sequence of images, perform forward propagation;
    responsive to a determination that the object is located at the end of the sequence of images, perform backward propagation; and
    responsive to a determination that the object is located at a position other than the start or end of the sequence of images, perform both forward and backward propagation.

19. A computer program product for creating custom datasets, the computer program product comprising:
    a computer-readable storage medium having program instructions embodied thereon to perform the operations of:

capturing, with a camera, a sequence of images of a surface in a specified crawl direction over a number of sequential crawl steps that represent changes of camera position;

for each crawl step, matching a first image and a second image captured at sequential camera positions; and modeling each crawl step as a pairwise quadratic transformation between the first image and second image according to a number of respective anchor points in each image selected as best candidates to fit a regression model.

20. The computer program product of claim 19, the computer-readable storage medium further comprising instructions for:

receiving input of a bounding box around an object on the surface; and predicting a trajectory of the vertices of the bounding box over the sequence of images according to the crawl step modeling.

* * * * *